United States Patent
McCallister et al.

(10) Patent No.: US 6,452,948 B1
(45) Date of Patent: Sep. 17, 2002

(54) METHOD FOR BAUD-CLOCK PHASE SYNCHRONIZATION IN A TDMA DIGITAL COMMUNICATIONS SYSTEM AND APPARATUS THEREFOR

(75) Inventors: Ronald D. McCallister, Scottsdale; Bruce A. Cochran; Eric M. Brombaugh, both of Mesa, all of AZ (US)

(73) Assignee: Sicom, Inc., Scottsdale, AZ (US)

( * ) Notice: Subject to any disclaimer, the term of this patent is extended or adjusted under 35 U.S.C. 154(b) by 0 days.

(21) Appl. No.: 09/095,116

(22) Filed: Jun. 10, 1998

(51) Int. Cl.$^7$ ................................. H04B 1/38
(52) U.S. Cl. ................ 370/503; 370/324; 370/516; 375/355
(58) Field of Search ............... 370/206, 321, 370/324, 345, 350, 442, 458, 498, 503, 512, 516; 375/232, 233, 354, 355, 356; 455/502

(56) References Cited

U.S. PATENT DOCUMENTS

| | | | | |
|---|---|---|---|---|
| 4,107,608 A | * | 8/1978 | Saburi | 325/4 |
| 4,704,582 A | * | 11/1987 | Dixon et al. | 329/50 |
| 4,825,448 A | * | 4/1989 | Critchlow et al. | 375/355 |
| 4,866,647 A | * | 9/1989 | Farrow | 708/313 |
| 5,177,769 A | * | 1/1993 | Arnold et al. | 375/60 |
| 5,241,688 A | * | 8/1993 | Arora | 455/51.1 |
| 5,671,257 A | * | 9/1997 | Cochran et al. | 375/355 |
| 6,055,284 A | * | 4/2000 | Kweon | 375/355 |

OTHER PUBLICATIONS

Kim et al, A New Unbiased Symbol Synchronization Loop Using Fixed Clock and Non–Ideal Interpolator, IEEE, pp. 196–197, 1997.*
Verdin et al, Symobol–Timing Recovery for M–PSK Modulation Schemes Using the Signum Function, pp. 1–7, 1995.*
Sabel et al, Improved Delay Root–Nyquist Filters for Symbol Synchronization in PCS Receivers, IEEE, pp. 1302–1306, 1995.*

(List continued on next page.)

Primary Examiner—Wellington Chin
Assistant Examiner—Frank Duong
(74) Attorney, Agent, or Firm—Lowell W. Gresham; Jordan M. Meschkow; Meschkow & Gresham

(57) ABSTRACT

A time division multiple access digital communications system (12) is provided. The system (12) has a base station (14) configured to generate a receive baud clock (86) and has a receiver (18) and a transmitter (20). The system also has a subscriber unit (16) configured to generate a transmit baud clock (50), and has a transmitter (28) and a receiver (26). The subscriber unit transmitter (28) is configured to transmit a reverse channel signal (54) that incorporates the transmit baud clock (50) as a component thereof. The base station receiver (18) is configured to receive the reverse channel signal (54) from the subscriber unit (16) and produce a phase-error signal ($\mu'$) in response to a phase difference between the transmit baud clock (50) and the receive baud clock (86). The base station transmitter (20) is configured to transmit the phase-error signal ($\mu'$) to the subscriber unit receiver (26). The subscriber unit transmitter (28) contains an interpolator (122) configured to adjust the phase of the transmit baud clock (50) in response to the phase-error signal.

17 Claims, 6 Drawing Sheets

OTHER PUBLICATIONS

Mueller, Kurt H. and Muller, Markus, "Timing Recovery in Digital Synchronous Data Receivers", IEEE Transactions on Communications, vol. Com–24, No. 5, May 1976, pp. 516–531.*

Farrow, C.W., A Continuously Variable Digital Delay Element, IEEE Transactions on Communications, 1998, pp. 2641–2645.*

Fitz, Michael P. and Lindsey, William C. "Decision–Directed Burst–Mode Carrier Synchronization Techniques", IEEE Transactions on Communications, vol. 40 No. 10, Oct. 1992, pp. 1644–1653.

Liu, Ging–Shing and Wei, Che–Ho, "A New Variable Fractional Sample Delay Filter With Nonlinear Interpolation", IEEE Transactions on Circuits and Systems–II: Analog and Digital Signal Processing vol. 39 No. 2, Feb. 1992, pp. 123–126.

Gardner, Floyd M., "Interpolation in Digital Modems–Part I Fundamental", IEEE Transactions On Communications, vol. 41, No. 3, Mar. 1993, pp. 501–507.

Erup, Lars et al., "Interpolation in Digital Modems–Part II: Implementation and Performance", IEEE Transactions On Communications, vol. 41, No. 6, Jun. 1993, pp. 998–1008.

Meyr, Heinrich, et al. "On Sampling Rate, Analog Prefiltering, and Sufficient Statistics for Digital Receivers", IEEE Transactions On Communications, vol. 42, No. 12, Dec. 1994, pp. 3208–3214.

Cowley, William G. and Sabel, Lesley P., The Performance of Two Symbol Timing Recovery Algorithms for PSK Demodulators, IEEE 1994, pp. 2345–2355.

Bucket, K. and Moeneclaey, M., "Symbol Synchronizer Performance Affected By Non–Ideal Interpolation in Digital Modems", IEEE 1994, pp. 929–933.

Bucket, Katrien and Moeneclaey, Marc, "The Effect of Interpolation on the BER Performance of Narrowband BPSK and (O)QPSK on Rician–Fading Channels", IEEE Transactions on Communications, vol. 42, No. 11, Nov. 1994, pp. 2929–2933.

Vesma, Jussi, et al., "Comparison of Efficient Interpolation Techniques for Symbol Timing Recovery", IEEE 1996, pp. 953–957.

Vesma, Jussi and Saramäki, "Optimization and Efficient Implementation of Fir Filters With Adjustable Fractional Delay", IEEE 1997, pp. 2256–2259.

* cited by examiner

METHOD FOR BAUD-CLOCK PHASE SYNCHRONIZATION IN A TDMA DIGITAL COMMUNICATIONS SYSTEM AND APPARATUS THEREFOR

TECHNICAL FIELD OF THE INVENTION

The present invention relates to digital communications systems. More specifically, the present invention relates to baud clock synchronization between base stations and subscriber units of time division multiple access digital communications systems.

BACKGROUND OF THE INVENTION

In many digital radio communications systems, communication between base stations and subscriber units is effected in both the frequency domain (i.e., utilizing multiple frequency channels) and the time domain (i.e., utilizing multiple time slots per frequency channel). It is desirable that the resultant composite spectrum be used efficiently.

In the frequency domain, the efficient use of the available spectrum depends in a large part upon the methodology used to maintain spectral occupancy. Modulation, through non-linear amplification, or through crossover, intermodulation, or other distortions, tends to cause a spreading of the bandwidth required of a given signal. This creates a need for guard bands, i.e., unassigned frequencies between allocated channels, inversely proportional to the spectral occupancy. The greater the spectral occupancy (i.e., the less the signal occupies unallocated frequencies), the lesser the guard band allocation required in compensation, and the more efficient the frequency allocation scheme.

A common method of improving spectral occupancy in digital communications systems is to utilize a pulse shaper to effectively transfer signal spread from the frequency domain to the time domain. By using filters that spread the energy from each signal pulse over several baud intervals, spectral occupancy of the digital signal is significantly maximized. This increase in spectral occupancy allows the achievement of a more efficient frequency channel allocation scheme.

Unfortunately, spreading a given pulse over multiple baud intervals creates an inter-symbol interference (ISI) problem. ISI exists when the energy from one symbol pulse interferes with the energy from another symbol pulse, masking or otherwise distorting portions of the data stream.

The use of a bandwidth-efficient pulse shaper, such as a square-root Nyquist (SRN) pulse shaper, can minimize the effects of ISI. With an SRN pulse shaper, each individual pulse can extend up to ten or more baud intervals before and after the peak baud interval. When a given pulse is passed through an SRN pulse shaper, it exhibits maximum energy at only one instant and zero energy at all other instants displaced before and after the peak instant by integral baud intervals. In a typical data stream where pulses are displaced by integral baud intervals, when the energy of a given pulse is at its peak, the energy of every other pulse is at zero, thus effectively controlling ISI.

The use of an SRN pulse shaper spreads the energy of a given pulse over a significant number of baud intervals. This creates significant ISI between adjacent pulses that are not separated by an integral number of baud intervals, such as signals from different subscriber units having adjacent time-slot allocations in the time domain. This time domain spreading creates a need for guard slots, i.e., unassigned time slots between allocated time slots. In other words, by exchanging a signal spread in frequency for a signal spread in time, the use of an SRN pulse shaper has exchanged an allocation inefficiency in the frequency domain for one in the time domain.

A like situation may also occur in an FDMA system where a user is assigned a frequency channel immediately after a previous user has vacated that channel. Care must be taken to prevent interference between the trailing pulses of the previous user and the leading pulses of the new user. Therefore, TDMA, in the sense used herein, also includes those FDMA situations where adjacent signal timing may produce interference.

Even with the use of SRN pulse shapers, therefore, a problem exists within a TDMA digital communications system. Such a system incorporates multiple subscriber units for use with a single base station. Each subscriber unit has a transmitter with an independent baud clock. Therefore, guard slots are required between adjacent allocated time slots in order to minimize interference between the subscriber unit transmissions. This represents an inefficient use of time-domain allocations. This inefficiency can severely impede overall system performance. The use of high-speed burst transmissions exaggerates this impediment.

One approach to the minimization of a need for guard slots is to use a long phase-locked loop encompassing both a base station and a subscriber unit to effect the synchronization of a subscriber unit transmit baud clock with a "standard" base station receive baud clock. A marked disadvantage of this approach is that when such a phase-locked loop has a loop filter wide enough to track the phase differences between the baud clocks, the variable-frequency oscillator tends to hunt, producing a high degree of phase jitter. Conversely, when the loop filter is tight enough to prevent excessive carrier phase tracking jitter, it has difficulty tracking the phase noise of the oscillator. These problems are characteristic of phase-locked loops utilizing variable-frequency oscillators.

SUMMARY OF THE INVENTION

Accordingly, it is an advantage of the present invention that a method of synchronizing the phases of independent subscriber unit baud clocks with a base station baud clock is provided.

It is another advantage of the present invention that a time division multiple access (TDMA) digital communications system is provided in which, within a base station, a baud clock in each subscriber unit is coherent with a baud clock in that base station.

It is yet another advantage of the present invention that an interpolator is incorporated into a subscriber unit transmitter and configured to adjust a subscriber unit baud clock phase within that subscriber unit so as to cause that subscriber unit baud clock phase to be substantially equal to a base station baud clock phase within that base station.

It is another advantage of the present invention that a long phase-locked loop utilizing a fixed-frequency oscillator is effected to synchronize the phases of a subscriber unit transmit baud clock and a base station receive baud clock.

These and other advantages are realized, in one form, by a method for synchronization of a time division multiple access digital communications system incorporating a base station and a subscriber unit. This method includes the steps of generating a baud clock within the subscriber unit, adjusting the baud clock phase via an interpolator within a transmitter within the subscriber unit, and broadcasting a reverse channel signal having the baud clock as a component thereof via the subscriber unit transmitter,

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
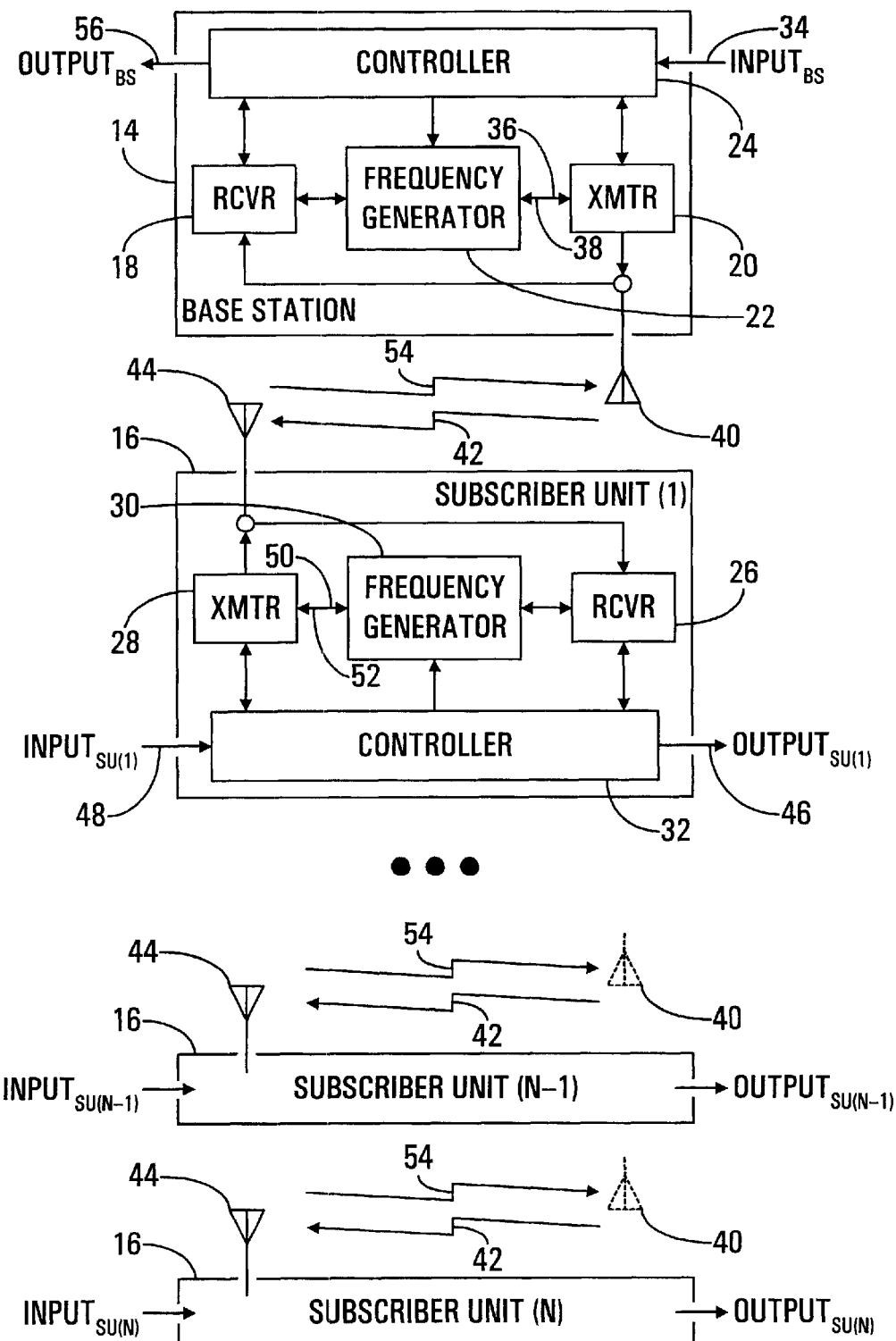
FIG. 1 depicts a simplified block diagram of a cell of a time division multiple access (TDMA) digital communications system configured in accordance with a preferred embodiment of the present invention.

FIG. 1 depicts a simplified block diagram of a cell 10 of a time division multiple access (TDMA) digital communications system 12 configured in accordance with a preferred embodiment of the present invention. System 12 may be a cellular type communications system in which any number of geographically distinct cells 10 are provided. Only a single cell 10 of system 12 is depicted in FIG. 1.

Cell 10 includes at least one base station 14 and any number of subscriber units 16. Each subscriber unit 16 is geographically separated from base station 14 and from all other subscriber units 16. In the preferred embodiment, base station 14 and subscriber units 16 are located within a few miles of each other, but different subscriber units 16 are located at different distances from base station 14. Neither base station 14 nor subscriber units 16 move a significant amount relative to each other.

In one embodiment, cell 10 may include a plurality of base stations 14, each of which independently communicates with subscriber units 16 within a particular sector of cell 10. Alternatively, cell 10 may use a common base station 14 to communicate with all subscriber units 16 within cell 10, i.e., cell 10 may be considered to have a single sector. For simplicity, the discussion hereinbelow assumes that system 12 has one cell 10 in which a common base station 14 communicates with all subscriber units 16. Those skilled in the art may readily adapt the teachings of the present invention to systems 12 having other configurations.

Base station 14 includes a receiver 18, a transmitter 20, a frequency generator 22, and a controller 24. Receiver 18 and transmitter 20 couple to controller 24. Data may be passed between controller 24 and a data network (not shown), such as a public switched telecommunications network.

Similarly, each of subscriber units 16 includes a receiver 26, a transmitter 28, a frequency generator 30, and a controller 32. Receiver 26 and transmitter 28 couple to controller 32. Data may be passed between controller 32 and a user network (not shown), such as a private communications or computer network.

In the preferred embodiment, a communication from base station 14 to subscriber unit 16 is effected as follows. Base station 14 receives input data from the data network (not shown) through an input port 34. Controller 24 routes the input data from port 34 to transmitter 20. Transmitter 20 modulates the input data using a transmit baud clock 36 from frequency generator 22. Transmitter 20 then mixes the modulated input data with a transmit carrier clock 38 from frequency generator 22 and broadcasts the result from an antenna 40 as forward channel signal 42.

At least one subscriber unit 16 resides within range of base station 14. This subscriber unit 16 receives forward channel signal 42 through an antenna 44 into receiver 26. Receiver 26 demodulates forward channel signal 42 into output data. Controller 32 routes the output data from receiver 26 through an output port 46 and to the user network (not shown).

Similarly, in the preferred embodiment, a subscriber unit to base station communication is effected as follows. Subscriber unit 16 receives input data from the user network (not shown) through an input port 48. Controller 32 routes the input data from port 48 to transmitter 28. Transmitter 28 modulates the input data using a transmit baud clock 50 from frequency generator 30. Transmitter 28 then mixes the modulated input data with a transmit carrier clock 52 from frequency generator 30 and broadcasts the result from antenna 44 as a reverse channel signal 54.

Base station 14 receives reverse channel signal 54 through antenna 40 into receiver 18. Receiver 18 demodulates reverse channel signal 54 into output data. Controller 24 routes the output data from receiver 18 through an output port 56 and to the data network (not shown).

Those skilled in the art will appreciate that there are multiple ways in which cell 10 may be implemented and that within each of these ways there are multiple methodologies by which communications may be effected. The use of other implementations and other effectuations departs from neither the scope nor the spirit of the present invention.

Figure 2:
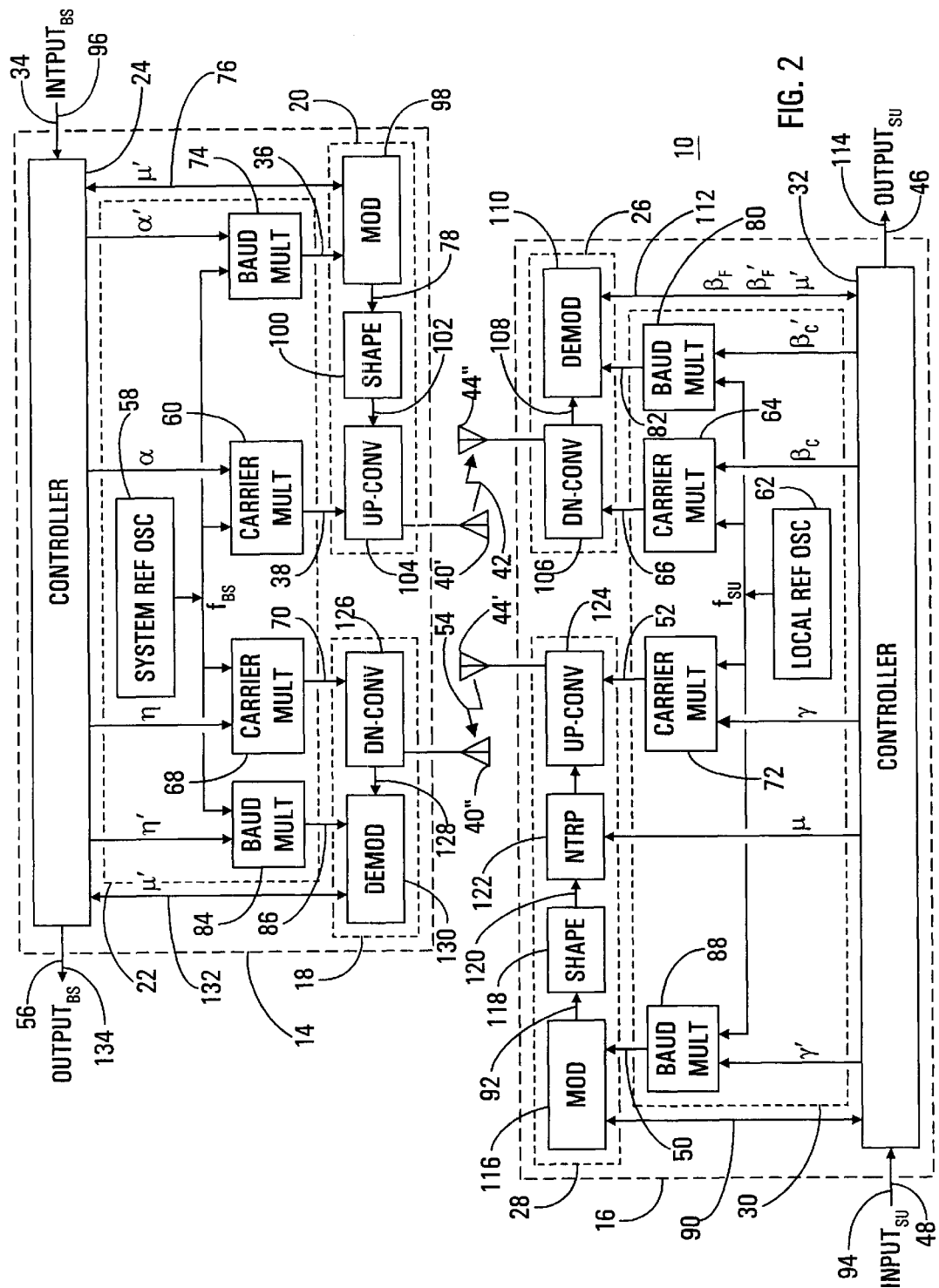
FIG. 2 depicts a block diagram of a base station and a subscriber unit of the system cell depicted in FIG. 1 in accordance with a preferred embodiment of the present invention.

FIG. 2 depicts a block diagram of base station 14 and subscriber unit 16 of cell 10 in accordance with a preferred embodiment of the present invention. The following discussion refers to FIG. 2, and assumes that subscriber unit 16 as depicted in FIG. 2 is typical of any subscriber unit 16 as depicted in FIG. 1.

In the preferred embodiment, it may be seen that, in base station 14, frequency generator 22 contains a system reference oscillator 58. Oscillator 58 determines the frequency standards for cell 10, hence typically has high accuracy and high stability. The output of oscillator 58 is a base station reference frequency $f_{BS}$. Frequency $f_{BS}$ is passed to a transmit carrier multiplier 60 whose multiplicand is a value $\alpha$ a provided by controller 24. The output of transmit carrier multiplier 60, i.e., $\alpha \times f_{BS}$, is transmit carrier clock 38. Transmit carrier clock 38 is passed to transmitter 20 and establishes a carrier or broadcast frequency $f_{FC}$ (not shown) of forward channel signal 42, where $f_{FC} = \alpha \times f_{BS}$.

In subscriber unit 16, frequency generator 30 contains a local reference oscillator 62. Oscillator 62 determines the frequencies only for subscriber unit 16, hence need not have the high accuracy and high stability of base station reference oscillator 58. The output of oscillator 62 is a subscriber unit reference frequency $f_{SU}$. Frequency $f_{SU}$ is passed to a receive carrier multiplier 64 whose multiplicand is a value $\beta_C$ provided by controller 32. The output of receive carrier multiplier 64, i.e., $\beta_C \times f_{SU}$, is a receive carrier clock 66 roughly equal in frequency to forward channel carrier frequency $f_{FC}$. Receiver 26, in response to forward channel carrier frequency $f_{FC}$ and receive carrier clock 66, produces a value $\beta_F$, which is passed to controller 32. The relationship between values $\beta_C$ and $\beta_F$ are such that a value $\beta$ (not shown) equals $(\beta_C + \beta_F)$, where $f_{FC} = \beta \times f_{SU}$.

Similarly, base station reference frequency $f_{BS}$ is passed to a receive carrier multiplier 68 whose multiplicand is a value $\eta$ provided by controller 24. The output of receive carrier multiplier 68, i.e., $\eta \times f_{BS}$, is a receive carrier clock 70. Receive carrier clock 70 is passed to receiver 18 and establishes a carrier or broadcast frequency $f_{RC}$ for reverse channel signal 54, where $f_{RC} = \eta \times f_{BS}$.

Subscriber unit reference frequency $f_{SU}$ is passed to a transmit carrier multiplier 72 whose multiplicand is a value $\gamma$ provided by controller 32. The output of transmit carrier multiplier 72, i.e., $\gamma \times f_{SU}$, is transmit carrier clock 52. Transmit carrier clock 52 is passed to transmitter 28. The value $\gamma$ is determined as a function of the values $\alpha$, $\beta$, and $\eta$ according to the relationship $\gamma = (\eta \times \beta)/\alpha$, where $f_{RC} = \gamma \times f_{SU}$.

In an analogous manner, in base station 14, reference frequency $f_{BS}$ is passed to a transmit baud multiplier 74 whose multiplicand is a value $\alpha'$ provided by controller 24. The output of transmit baud multiplier 74, i.e., $\alpha' \times f_{BS}$, is transmit baud clock 36. Transmit baud clock 36 is passed to transmitter 20 and is used to modulate a forward configured data stream 76 to produce a forward pulse stream 78, becoming an integral part thereof in the process. Transmitter 20 then up-converts forward pulse stream 78 to produce forward channel signal 42. Transmit baud clock 36 is therefore a component of forward channel signal 42, and effects a forward channel baud frequency $f_{FB}$ (not shown), where $f_{FB} = \alpha' \times f_{BS}$.

In subscriber unit 16, subscriber unit reference frequency $f_{SU}$ is passed to a receive baud multiplier 80 whose multiplicand is a value $\beta_C'$ provided by controller 32. The output of receive baud multiplier 80, i.e., $\beta_C' \times f_{SU}$, is a receive baud clock 82 somewhat higher in frequency than base station transmit baud clock 36. Receiver 26, in response to forward channel baud frequency $f_{FB}$ and receive baud clock 82, produces a value $\beta_F'$, which is passed to controller 32. The relationship between values $\beta_C'$ and $\beta_F'$ are such that a value $\beta'$ (not shown) equals $(\beta_C' \times \beta_F')$, where $f_{FB} = \beta' \times f_{SU}$.

Similarly, base station reference frequency $f_{BS}$ is passed to a receive baud multiplier 84 whose multiplicand is a value $\eta'$ provided by controller 24. The output of receive baud multiplier 84, i.e., $\eta' \times f_{BS}$, is a receive baud clock 86. Receive baud clock 86 is passed to receiver 18 and establishes a baud frequency $f_{RB}$ for reverse channel signal 54, where $f_{RB} = \eta' \times f_{BS}$.

Subscriber unit reference frequency $f_{SU}$ is passed to a transmit baud multiplier 88 whose multiplicand is a value $\gamma'$ provided by controller 32. The output of transmit baud multiplier 88, i.e., $\gamma' \times f_{SU}$, is transmit baud clock 50. Transmit baud clock 50 is passed to transmitter 28. Transmitter 28 modulates a reverse configured data stream 90, in response to transmit baud clock 50, to produce a reverse modulated pulse stream 92. Reverse modulated pulse stream 92 conveys a single unit of data from a reverse digital data stream 94 per cycle of transmit baud clock 50, with each unit of data containing a predetermined number of bits, becoming an integral part thereof in the process. Transmitter 28 then up-converts reverse modulated pulse stream 92 to produce reverse channel signal 54. Transmit baud clock 50 is therefore a component of reverse channel signal 54. The value $\gamma'$ is determined as a function of the values $\alpha'$, $\beta'$, and $\eta'$ according to the relationship $\gamma' = (\eta' \times \beta')/\alpha'$, where $f_{RB} = \gamma' \times f_{SU}$.

System reference oscillator 58 and base station controller 24 establish, through subscriber unit controller 32 and multipliers 60, 68, 74, and 84, the broadcast and baud clock frequencies of forward and reverse channel signals 42 and 54. This is accomplished by adjusting, within subscriber unit 16, the values of multiplicands $\beta_C$, $\beta_C'$, $\gamma$, and $\gamma'$ as required to offset any variation of frequency $f_{SU}$ from frequency $f_{BS}$. This constitutes a "coherent" demodulation scheme, in that base station 14 provides a reference for any number of subscriber units 16, with each subscriber unit 16 being synchronized with base station 14.

Subscriber unit oscillator 62, therefore, may be of significantly lower accuracy, stability, and cost than base station oscillator 58, as any departure of subscriber unit reference frequency $f_{SU}$ from the frequency of base station reference frequency $f_{BS}$ is fully compensated. Oscillator 62, thus, contributes to the mass-production abilities of subscriber unit 16.

Those skilled in the art will appreciate that the above-described manner of frequency coordination between base station 14 and subscriber unit 16 are representative only of the preferred embodiment, and that other well-known manners may be used without departing from the spirit or scope of the teachings of the present invention.

The remainder of the discussion hereinbelow assumes that forward channel carrier frequency $f_{FC}$ (not shown), reverse channel carrier frequency $f_{RB}$ (not shown), forward channel baud frequency $f_{FB}$ (not shown), and reverse channel baud frequency $f_{RB}$ (not shown) are as described hereinabove. That is:

$f_{FC} = \alpha \times f_{BS} = \beta \times f_{SU}$, where $\beta = (\beta_C + \beta_F)$;

$f_{RC} = \eta \times f_{BS} = \gamma \times f_{SU}$, where $\gamma = (\eta \times \beta)/\alpha$;

$f_{FB} = \alpha' \times f_{BS} = \beta' \times f_{SU}$, where $\gamma' = (\eta_C' \times \beta_F')$; and $f_{RB} = \eta' \times f_{BS} = \gamma' \times F_{SU}$ where $\gamma' = (\eta' \times \beta')/\alpha'$.

In normal operation of the preferred embodiment of FIG. 2, a communication of forward data, i.e., data from base station 14 to subscriber unit 16, proceeds as follows. Within base station 14, controller 24 receives a forward (input) digital data stream 96 from the data network (not shown) through input port 34. Within controller 24, forward digital data stream 96 is appropriately configured, which configuration may include the inclusion of control information (not shown) within forward digital data stream 96, and passed as forward configured data stream 76 to transmitter 20. Within transmitter 20, forward configured data stream 76 is received by a modulator 98 and modulated into forward modulated pulse stream 78 having a baud rate determined by transmit baud clock 36. Forward modulated pulse stream 78 is then shaped by a pulse shaper 100 (discussed in more detail hereinbelow) into a forward shaped pulse stream 102. Forward shaped pulse stream 102 is then passed to an up-converter 104, where it is up-converted in response to transmit carrier clock 38 and transmitted, via a transmit antenna 40', as forward channel signal 42.

Within subscriber unit 16, forward channel signal 42 is received by receiver 26 via a receive antenna 44". Within receiver 26, a down-converter 106 receives and down-converts forward channel signal 42, in response to receive carrier clock 66, into a forward pulse stream 108. Forward pulse stream 108 is then demodulated by a demodulator 110 into a forward configured data stream 112 and passed on to controller 32. Within controller 32, any control information (not shown) incorporated into forward configured data stream 112 is extracted and a resultant forward (output) digital data stream 114 is passed to the user network (not shown) via output port 46.

Similarly, a communication of reverse data, i.e., data from subscriber unit 16 to base station 14, proceeds as follows. Within subscriber unit 16, controller 32 receives reverse (input) digital data stream 94 from the user network (not shown) through input port 48. Within controller 32, reverse digital data stream 94 is appropriately configured, which configuration may include the inclusion of control information (not shown) within reverse digital data stream 94, and passed as reverse configured data stream 90 to transmitter 28. Within transmitter 28, reverse configured data stream 90 is received by a modulator 116 and modulated into reverse modulated pulse stream 92 having a baud rate determined by transmit baud clock 50. Reverse modulated pulse stream 92 is then shaped by a pulse shaper 118 (discussed in more detail hereinbelow) into a reverse shaped pulse stream 120. Reverse shaped pulse stream 120 is then passed to an interpolator (NTRP) 122 (discussed in more detail hereinbelow), and from interpolator 122 to an up-converter 124, where it is up-converted in response to transmit carrier clock 52 and transmitted, via a transmit antenna 44', as reverse channel signal 54.

Within base station 14, reverse channel signal 54 is received by receiver 18 via a receive antenna 40". Within receiver 18, a down-converter 126 receives and down-converts reverse channel signal 54, in response to receive carrier clock 70, into a reverse pulse stream 128. Reverse pulse stream 128 is then demodulated by a demodulator 130 into a reverse configured data stream 132 and passed on to controller 24. Within controller 24, any control information (not shown) incorporated into reverse configured data stream 132 is extracted and a resultant reverse (output) digital data stream 134 is passed to the data network (not shown) via output port 56.

Those skilled in the art will appreciate that the preferred embodiment normal operation-scenario described hereinabove is but one of a plurality of scenarios for but one of a plurality of embodiments. The use of a variant scenario in the preferred or another embodiment does not depart from either the scope or the intent of the present invention. Also, antennas 40 and 44 in FIG. 1 have been depicted in FIG. 2 as having been partitioned into transmit antennas 40' and 44' and receive antennas 40" and 44", respectfully. Those skilled in the art will appreciate that this partitioning is depicted solely for convenience of the discussion, and that in actual practice no such partitioning need occur.

Figure 3:
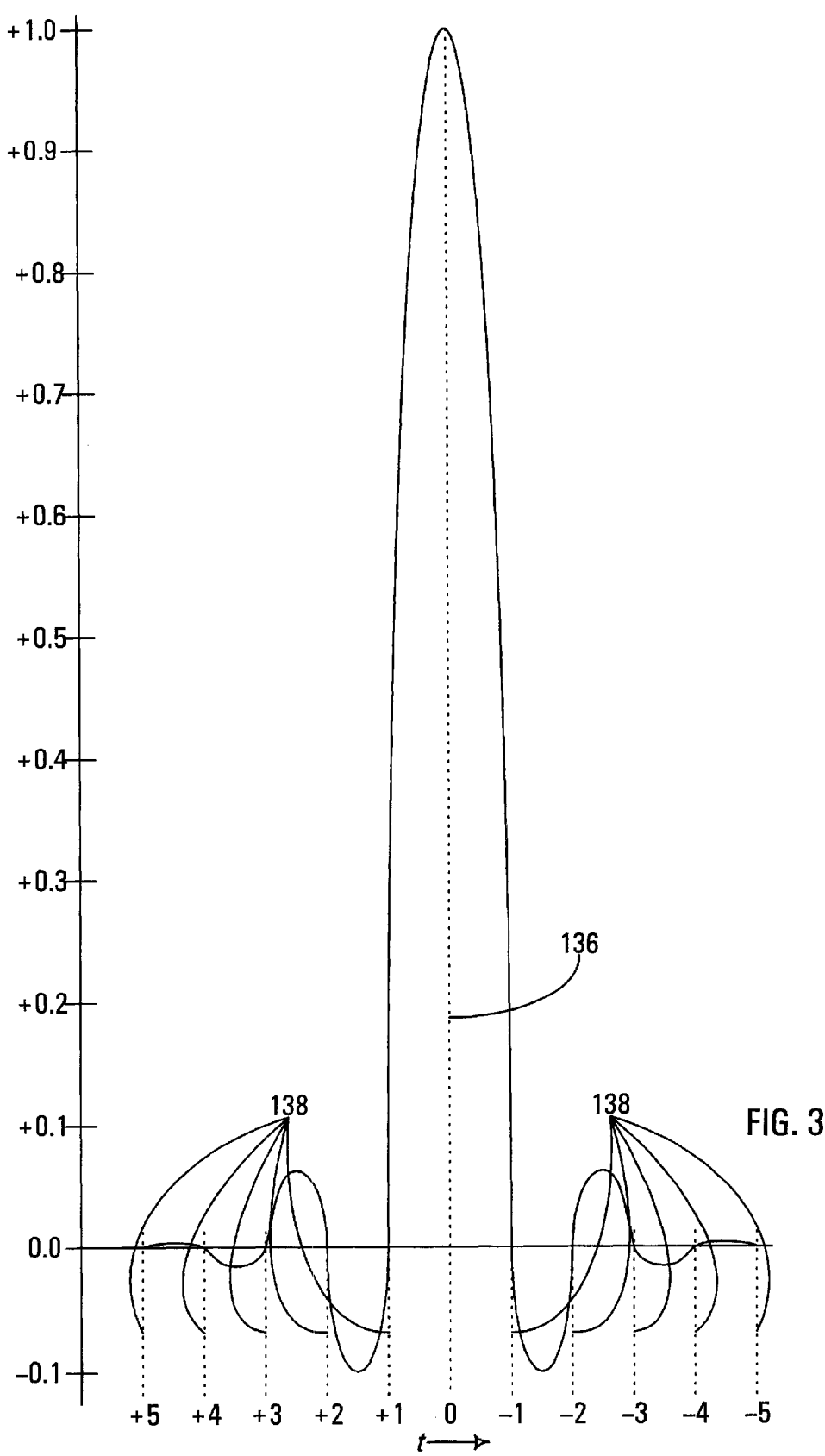
FIG. 3 depicts a response curve for a pulse shaper in accordance with a preferred embodiment of the present invention.

FIG. 3 depicts an exemplary response curve for pulse shapers 100 and 118 in accordance with a preferred embodiment of the present invention. The following discussion refers to FIGS. 2 and 3.

It is desirable that bandwidth allocations be optimized in digital communications systems 12. That is, the designer desirably strives to minimize the bandwidth required for a given amount of communication. This necessitates a maximization of spectral occupancy in the transmission of a data signal. This is accomplished in the preferred embodiment through the use of pulse shaper 100 within base station transmitter 20 and pulse shaper 118 within subscriber unit transmitter 28.

Pulse shapers 100 and 118, as depicted, are "square-root Nyquist" (hereinbelow "Nyquist") filters. In FIG. 3, the horizontal axis is expressed in integral cycles of the transmit baud clock and the vertical axis is normalized to the maximum filter throughput. Using subscriber unit pulse shaper 118 as an example, the horizontal axis of FIG. 3 is expressed in integral cycles of subscriber unit transmit baud clock 50. Pulse shaper 118 effects maximum throughput at a given moment in time 136, while effecting zero throughput at other moments 138 separated from maximum throughput moment 136 by integral cycles of transmit baud clock 50. Thus, when the energy of a given pulse in shaped pulse stream 120 is at its peak, the energy of every other pulse in shaped pulse stream 120 is at zero, and inter-symbol interference is eliminated in shaped pulse stream 120. An analogous description may be used for base station pulse shaper 100 using base station transmit baud clock 36.

Those skilled in the art will appreciate that pulse shapers 100 and 118 may be implemented utilizing other than Nyquist filters. Such other pulse shapers, however, may not demonstrate the integral baud clock cycle relationship between maximum throughput moment 136 and zero throughput moments 138 inherent in Nyquist filters, and thus do not effect zero inter-symbol interference. While it is recognized that, under certain circumstances, the use of a variant filter may be desirable for base station pulse shaper 100, and that such use departs from neither the intent nor the scope of the present invention, it shall be shown in discussion hereinbelow that a Nyquist filter is desirable for use as subscriber unit pulse shaper 118.

Figure 4:
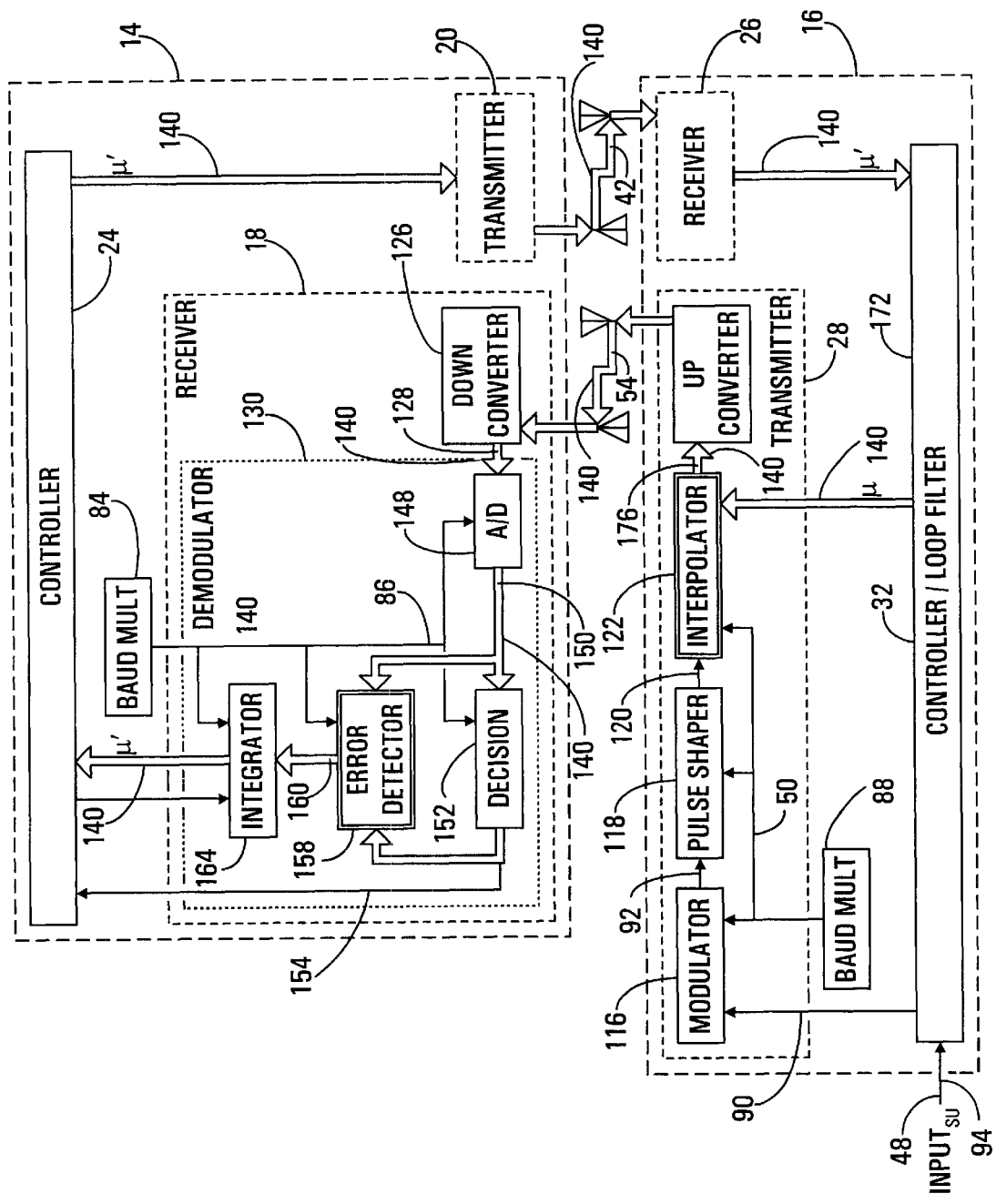
FIG. 4 depicts a simplified block diagram of the base station and the subscriber unit depicted in FIG. 2 and demonstrates a baud clock phase-error correction loop in accordance with a preferred embodiment of the present invention.
Figure 5:
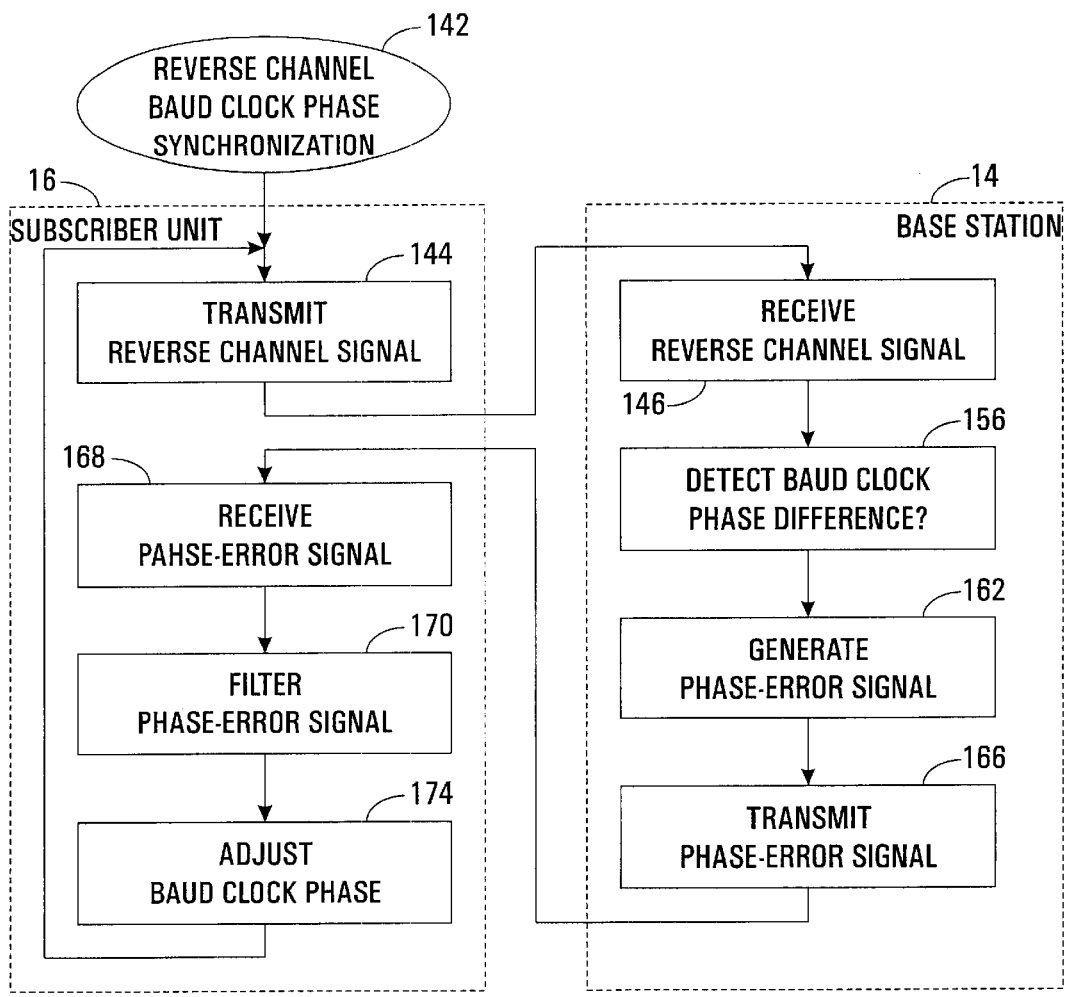
FIG. 5 depicts a flowchart of the operation of the baud clock phase-error correction loop depicted in FIG. 4 in accordance with a preferred embodiment of the present invention.

FIG. 4 depicts a simplified block diagram of base station 14 and subscriber unit 16 demonstrating a baud clock phase-error correction loop 140, and FIG. 5 depicts a flowchart of the operation of baud clock phase-error correction loop 140 in accordance with a preferred embodiment of the present invention. The following description refers to FIGS. 1, 4 and 5.

A problem exists when multiple subscriber units 16 are used with a single base station 14. In such a case, conventional implementations do not permit efficient use of the time domain. The use of a Nyquist filter for pulse shaper 118 spreads each individual pulse of modulated pulse stream 92 over up to ten or more intervals of transmit baud clock 50 before and after the baud clock interval containing maximum throughput moment 136 (FIG. 3). This spreading creates significant inter-symbol interference (ISI) between adjacent pulses that are not separated by an integral number of baud clock intervals, e.g., the pulses from different subscriber units 16.

This situation occurs in conventional TDMA systems when a final pulse of a reverse channel signal from one subscriber unit is immediately followed by an initial pulse of a reverse channel signal from another subscriber unit. Since a transmit baud clock in each subscriber unit is independently generated, the transmit baud clocks are not normally in phase either with each other or with a base station receive baud clock, even though the frequencies thereof may be equal. As a result, unless a guard slot of significant duration is interposed between the two reverse channel signals, the trailing energy of the final several pulses from the one subscriber unit interferes with the leading energy of the initial several pulses from the other subscriber unit. This would cause ISI corruption in both reverse channel signals.

In the preferred embodiment of the present invention, a solution to this ISI problem is achieved through the use of interpolator 122 within transmitter 28 of each subscriber unit 16. Interpolator 122 is used to adjust the phase of each subscriber unit transmit baud rate clock 50 within its specific subscriber unit 16 so that that baud clock 50 is in phase with base station receive baud clock 86 within base station 14. This phase adjustment is effected in response to a phase-error signal $\mu'$ generated within base station 14 and propagated within phase-error correction loop 140. In the preferred embodiment of FIGS. 4 and 5, a process 142 for the synchronization of TDMA system 12 is effected. Process 142 synchronizes the phase of subscriber unit transmit baud clock 50 with the phase of base station transmit baud clock 86 and corrects any phase errors.

In a transmit reverse channel signal task 144, subscriber unit 16 modulates, up-converts, and transmits reverse channel signal 54. If task 144 is performed during the initialization of subscriber unit 16, a synchronization data stream (not shown) is generated by controller 32 and passed to transmitter 28 as configured data stream 90. Such a synchronization data stream is simply a sequence of bits suitable for detecting the phase of transmit baud clock 50 within reverse channel signal 54, e.g., a repeating sequence of 1s and 0s. If task 144 is performed during normal operation, i.e., after subscriber unit 16 has been initialized, data stream 94 is received by controller 32 from the user network (not shown) via input port 48 and passed to transmitter 28 as configured data stream 90. Configured data stream 90 is then modulated, up-converted, and transmitted as reverse channel signal 54.

In a receive reverse channel signal task 146 following task 144, receiver 18 within base station 14 receives, down-converts, and demodulates reverse channel signal 54. Down-converter 126 receives and down-converts reverse channel signal 54 to produce pulse stream 128. Pulse stream 128 is then demodulated by demodulator 130 and data is extracted.

Within demodulator 130, pulse stream 128 from down converter 126 (i.e., reverse channel signal 54) is received by an analog to digital (a/d) converter 148, which then produces a digital pulse stream 150. Digital pulse stream 150 passes to a hard-decision generator 152 where hard decisions 154 of the values of the pulses of digital pulse stream 150 are generated in response to receive baud clock 86.

Following task 146, in a detect baud clock phase difference task 156, a phase-error detector 158 then detects a phase difference (not shown) between the pulses of digital pulse stream 150 and hard decisions 154, i.e., the input and output of hard-decision generator 152. Since the phase of digital pulse stream 150 is a function of subscriber unit transmit baud clock 50 within reverse channel signal 54, and the phase of hard decisions 154 is a function of base station receive baud clock 86, phase-error detector 158 effectively detects the phase difference between transmit baud clock 50 within demodulator 130 (i.e., after propagation between subscriber unit 16 and base station 14) and receive baud clock 86. The phase difference may be detected in a conventional decision-directed manner. Receive baud clock 86 serves as a standard reverse channel baud clock for all subscriber units 16 within a given cell 10 of system 12.

Phase-error detector 158 then generates a preliminary phase-error signal 160 in a task 162. Preliminary phase-error signal 160 is passed to a phase-error integrator 164. Within phase-error integrator 164, preliminary phase-error signal 160 is accumulated and integrated over time to smooth out "jitter" and other anomalies and produce a phase-error signal $\mu'$. Phase-error signal $\mu'$ is passed to controller 24.

Next, in a transmit phase-error signal task 166, controller 24 passes phase-error signal $\mu'$ to transmitter 20. In transmitter 20, base station 14 modulates, up-converts, and transmits phase-error signal $\mu'$ as a component of forward channel signal 42.

In a receive phase-error signal task 168 following task 166, subscriber unit 16 receives forward channel signal 42, of which phase-error signal $\mu'$ is a component. In receiver 26, subscriber unit 16 receives, down converts, and demodulates forward channel signal 42, effectively extracting phase-error signal $\mu'$ therefrom. Phase-error signal $\mu'$ is then passed to controller 32. Tasks 166 and 168, therefore, as used to propagate phase-error signal $\mu'$ from base station controller 24 to subscriber unit controller 32 over forward channel signal 42.

A filter phase-error signal task 170 follows task 168. In task 170, a loop filter 172 filters phase-error signal $\mu'$ to produce a filtered phase-error signal $\mu$. Through the use of loop filter 172, phase-error correction loop 140 functions as a long, slow update rate phase-locked loop (discussed hereinbelow). Because phase-error correction loop 140 has a slow update rate, loop filter 172 may be implemented in software within controller 32.

Controller 32 then, in an adjust baud clock phase task 174 following task 170, programs interpolator 122 to vary the phase of transmit baud clock 50 in response to filtered phase-error signal $\mu$, that is, in response to the phase difference, in demodulator 130 of receiver 18 of base station 14, between transmit baud clock 50 and receive baud clock 86. Interpolator 122 has as a first input shaped pulse stream 120 having a phase-unshifted transmit baud clock 50 as a component thereof, as a second input filtered phase-error signal $\mu$, and as an output combined data stream 176 having a phase-shifted transmit baud clock 50 as a component thereof. Interpolator 122 delays the phase of transmit baud clock 50 in response to filtered phase error signal $\mu$ so that transmit baud clock 50 will be in phase with base station receive baud clock 86 once transmit baud clock 50 has been propagated to demodulator 130 within base station receiver 18. Process 142 then returns to task 144.

It may be seen from the hereinabove discussion that phase-error correction loop 140 starts with the detection of a phase difference between subscriber unit transmit baud clock 50 and base station receive baud clock 86 by phase-error detector 158 in task 156. Loop 140 then proceeds with the generation of phase-error signal $\mu'$ by phase-error detector 158 and integrator 164 in task 162. Loop 140 then proceeds with the propagation of phase-error signal $\mu'$ from base station controller 24 to subscriber unit controller 32 in tasks 166 and 168. Loop 140 then filters phase-error signal $\mu'$ to establish the phase-locked loop characteristics of loop 140 and produce filtered phase-error signal $\mu$. Loop 140 then provides phase-error correction of subscriber unit transmit baud clock 50 via interpolator 122 in task 174 so that, in demodulator 130 of receiver 18 of base station 14, the phase difference between transmit baud clock 50 and receive baud clock 86 is substantially equal to zero. Loop 140 then proceeds with the propagation of corrected base station transmit baud clock from interpolator 122 to phase-error detector 158 in tasks 144 and 146. Loop 140 then repeats the above discussed process 142 to track the phase differences between subscriber unit transmit baud clock 50 and base station receive baud clock 86.

Those skilled in the art will appreciate that the description of process 142 hereinabove is exemplary of one of a plurality of processes that may be used to fulfill the same functions, and that the use of a variant process departs from neither the scope nor the intent of the teachings of the present invention.

Process 142, as described hereinabove, serves to bring transmit baud clock 50 of a given subscriber unit 16 into phase with receive baud clock 86 of base station 14. Since base station 14 may communicate with any number of subscriber units 16 (FIG. 1), process 142 is repeated for each subscriber unit 16 in communication with base station 14.

Hence, transmit baud clock 50 of each subscriber unit 16 in communication with a specific base station 14 is brought into phase with receive baud clock 86 thereof. As a result, in cell 10 having one base station 14, all subscriber unit transmit baud clocks 50 share a common frequency and phase within base station 14, i.e., they are coherent within demodulator 130 of receiver 18 of base station 14. Furthermore, any tendency of any subscriber unit transmit baud clock 50 to lose coherency is corrected by process 142 through phase-error correction loop 140 for that subscriber unit 16.

As depicted in the preferred embodiment, phase-error correction loop 140 is a slow update rate phase lock loop. In demodulator 130 of receiver 18 in base station 14, integrator 164 accumulates and integrates all phase differences between subscriber unit transmit baud clock 50 and receive baud clock 86 for an entire burst of reverse channel signal 54. This provides loop 140 with an update rate for phase-error signal $\mu'$ of once per burst. Because of this slow response, the present invention is unable to track rapidly changing baud clock phases, such as those encountered with the varying propagation times inherent in mobile communications systems. That is, in the preferred embodiment, the present invention makes use of the propagation stability inherent between base stations 14 and subscriber units 16 that are stationary relative to each other.

During normal operation (initialization being a special case), phase-error signal $\mu'$ reflects the detection of a small phase difference between transmit baud clock 50 and receive baud clock 86. These small phase differences result from inaccuracies in the frequency tracking loop, i.e., where $\eta' \times f_{BS} \gamma' \times f_{SU}$, because of inaccuracies, life-cycle drift, thermal drift, noise, etc., in subscriber unit reference oscillator 62 (FIG. 2), transmit baud clock multiplier 88, controller 32, or other components. The phase difference is also small because, not being a variable oscillator, any variations in oscillator 62 occur very slowly. The same holds true for all subscriber units 16 in cell 10 having multiple base stations 14 where all base stations 14 share a common receive baud clock 86 (i.e., have a common reference baud clock).

Phase-error correction loop 140 is a slow loop. That is, a significant amount of system time (as contrasted to human time) elapses between the detection and elimination of a phase difference. Process 142, therefore, is best suited to systems 12 where base stations 14 and subscriber units 16 are stationary relative to each other.

Since transmit baud clocks 50 for all subscriber units 16 in communication with a given base station 14 are coherent, the use of Nyquist filters for pulse shapers 118 in each of those subscriber units 16 causes maximum throughput moments 136 (FIG. 3) and zero throughput moments 138 (FIG. 3) of each pulse of each reverse channel signal 54 to fall at the same instant relative to the beginning of each cycle of the receive baud clock 86. This means that the trailing energy of the final pulses of a first reverse channel signal 54 from a first subscriber unit 16 does not interfere with the leading energy of the initial pulses of a second reverse channel signal 54 from a second subscriber unit 16. Therefore, ISI corruption is eliminated. Hence, little or no guard slot need be allowed between reverse channel signals 54 from different subscriber units 16 to eliminate ISI.

Those skilled in the art will note that other pulse shapers which possess the relationship between maximum throughput moment 136 and zero throughput moments 138 may be used in pulse shapers 118. The use of Nyquist filters for pulse shapers 118, in conjunction with interpolators 122, allows the packing of subscriber unit allocations in the time domain with a corresponding increase in TDMA system 20 communication efficiency.

Phase-error correction loop 140 is a long phase-locked loop intended to effect phase synchronization of subscriber unit transmit baud clock 50 and base station receive baud clock 86. Those skilled in the art will appreciate that secondary loops not discussed in detail herein provide for frequency synchronization of baud clocks 50 and 86. Since, during normal operation, the frequencies of baud clocks 50 and 86 are always substantially equal, it becomes a small matter for loop 140 to keep the phases substantially equal as well. Since loop 140 is a slow loop, with a an update rate of once per burst of reverse channel signal 54, any small phase difference that may creep in is quickly resolved, with each burst providing correction for the following burst.

Figure 6:
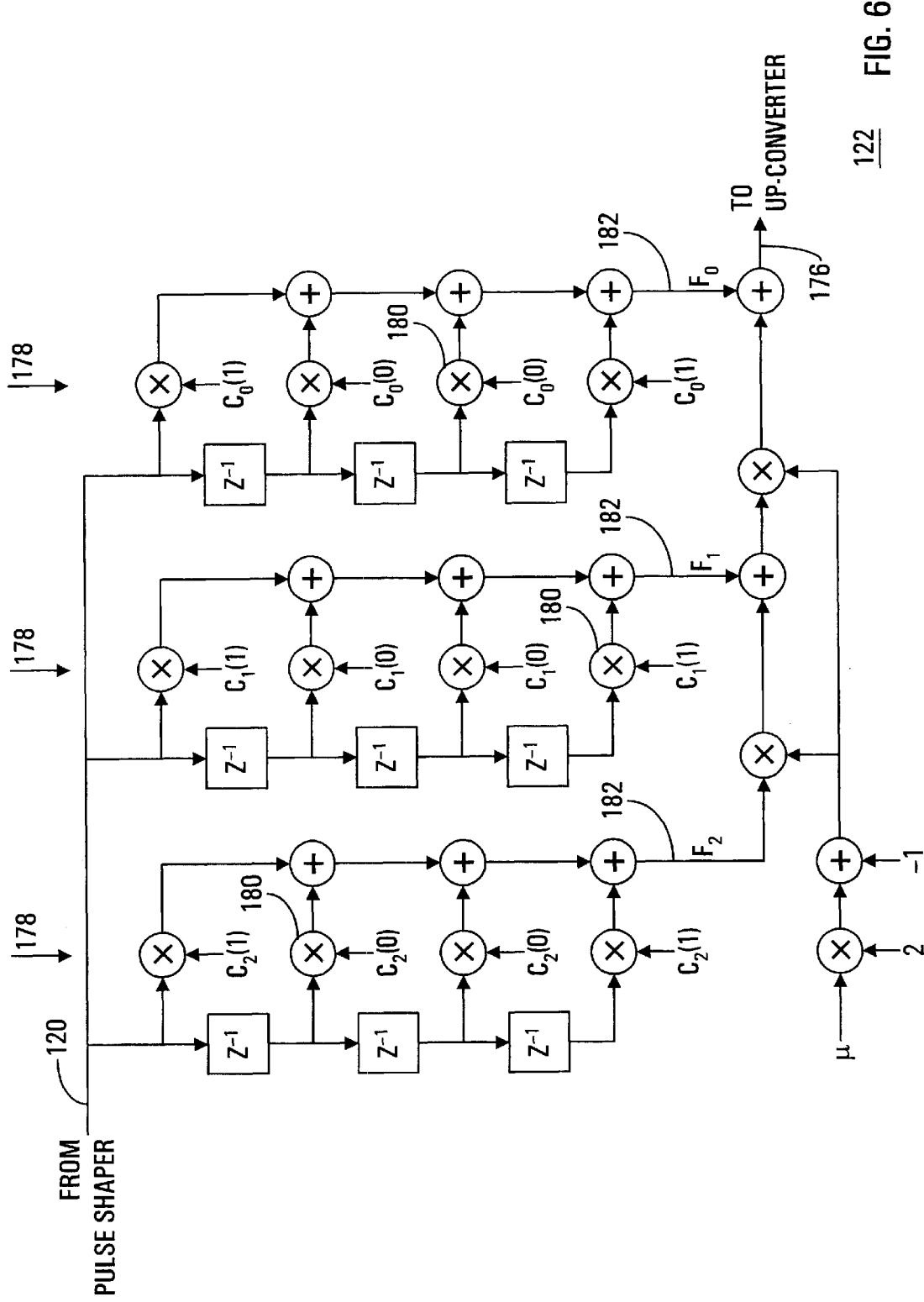
FIG. 6 depicts a block diagram of an interpolator in accordance with a preferred embodiment of the present invention.

FIG. 6 depicts a block diagram of interpolator 122 in accordance with a preferred embodiment of the present invention. The following discussion refers to FIGS. 4 and 6.

In the preferred embodiment, interpolator 122 is a form of a Farrow filter utilizing N finite impulse response (FIR) filters 178, where N is an integer number. Each filter 178 has a plurality of multipliers 180 having coefficients $C_n(i)$ and operates upon shaped pulse stream 120. Each coefficient $C_n(i)$ of each filter 178 is a piecewise polynomial. Within interpolator 122, filters 178 produce N intermediate filtered signals 182, each of which has a value $F_N$.

Filtered phase-error signal $\mu$ is expressed as a fractional interval of a cycle of subscriber unit transmit baud clock 50. Interpolator 122 obtains filtered phase-error signal $\mu$ from controller 32. Within interpolator 122, the value of filtered phase error signal $\mu$ is multiplied against combinations of intermediate filtered signals 182 such that the output of interpolator 122 is combined data stream 176, and is substantially equal to the value.

$$\sum_{1}^{N} (F_{(N-1)}(2\mu - 1)^{N-1}).$$

The use of this form of Farrow filter for interpolator 122 produces fewer spectral images at lower magnitudes than with other Farrow interpolators, such as those using linear or cubic-LaGrange interpolation methodologies. It is desirous to minimize these spectral images as they represent out-of-band spectral components, and potentially distortions of the pulse shapes.

Those skilled in the art will appreciate that interpolator 122 utilizes an array of digital multipliers 180 for FIR filters 178. Multipliers 216 may be implemented as a full n×m multiplying circuits or, when either n or m is a combinatorial function of powers of two, as a shift-and-add circuit. In the present invention, it is desirable to utilize full multiplying circuits as the coefficients $C_n(i)$ are not normally a combinatorial function of powers of two in all cases. In other words, just as the present invention benefits from the use of Nyquist filters for pulse shapers 118, so does it benefit from the use of a Farrow filter utilizing N true-multiplying FIR filters. The use of other FIR filters for specialized cases does not depart from the scope or intent of the teachings of the present invention.

In summary, the present invention teaches a methodology and an apparatus by in which interpolator 122 is used in transmitter 28 of a plurality of subscriber units 16 to adjust the phase of transmit baud clock 50 so as to cause transmit baud clock 50 to be coherent with receive baud clock 86 of base station 14 within demodulator 130 of receiver 18 of base station 14. By establishing this coherency, the allocation of guard slots between time slots allocated to differing subscriber units 16 is minimized in each cell 10 of TDMA digital communications system 12.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for synchronization of a time division multiple access digital communications system incorporating a base station and a subscriber unit, wherein a communication from said base station to said subscriber unit is effected via a forward channel signal, a communication from said subscriber unit to said base station is effected via a reverse channel signal, and said method comprises the steps of:

generating, within said subscriber unit, a subscriber unit baud clock exhibiting a subscriber unit baud clock phase;

configuring a transmitter of said subscriber unit to receive said subscriber unit baud clock and to include an interpolator responsive to said subscriber unit baud clock;

generating, within said base station, a base station baud clock exhibiting a base station baud clock phase, wherein said subscriber unit baud clock and said base station baud clock are substantially equal in frequency;

producing, within said base station, a phase-error signal in response to a phase difference between said subscriber unit baud clock and said base station baud clock;

adjusting, via said interpolator, said subscriber unit baud clock phase in response to said phase-error signal; and broadcasting, via said transmitter of said subscriber unit, said reverse channel signal having said subscriber unit baud clock phase as a component thereof.

2. A method as claimed in claim 1 additionally comprising the steps of:

propagating said phase-error signal from said base station to said subscriber unit as a component of said forward channel signal; and programming said interpolator in response to said phase-error signal.

3. A method as claimed in claim 2 additionally comprising the step of repeating said adjusting step, said broadcasting step, said producing step, said propagating step, and said programming step so that until said difference between said subscriber unit baud clock phase and said base station baud clock phase substantially averages zero.

4. A method as claimed in claim 2 wherein:

said method additionally comprises the step of filtering said phase-error signal to produce a filtered phase-error signal; and said programming step programs said interpolator in response to said filtered phase-error signal.

5. A method as claimed in claim 2 wherein said adjusting step adjusts said subscriber unit baud clock phase in said subscriber unit to cause said subscriber unit baud clock phase to be substantially equal to said base station baud clock phase in said base station.

6. A method as claimed in claim 1 wherein:

said method additionally comprises the step of modulating a stream of data into a stream of modulated pulses according to said data so that said stream of modulated pulses conveys a single unit of data per cycle of said baud clock, wherein said unit of data includes a predetermined number of bits;

said method additionally comprises the step of shaping said modulated pulses to produce shaped pulses that extend over a plurality of cycles of said baud clock; and said adjusting step comprises the step of delaying said shaped pulses in said interpolator.

7. A method as claimed in claim 6 additionally comprising the step of obtaining a value $\mu$, where said value $\mu$ is a fractional interval of a cycle for said baud clock, and said delaying step comprises the steps of:

filtering said shaped pulses using N finite impulse response (FIR) filters, where N is an integer number, to generate N intermediate filtered signals $F_N$, where $F_N$ represents respective ones of said N intermediate filtered signals; and combining said intermediate filtered signals so that a combined data stream substantially equals.

$$\sum_1^N (F_{(N-1)} \times (2\mu - 1)^{N-1}).$$

8. A time division multiple access digital communications system comprising:

a base station configured to produce a phase-error signal; and a subscriber unit in data communication with said base station and configured to generate a baud clock exhibiting a baud clock phase, wherein said subscriber unit comprises a subscriber unit transmitter, said subscriber unit transmitter comprises an interpolator configured to be responsive to said baud clock and to adjust said baud clock phase in response to said phase-error signal, and said subscriber unit transmitter is configured to transmit a reverse channel signal that incorporates said baud clock as a component thereof.

9. A digital communications system as claimed in claim 8 wherein said baud clock and said baud clock phase are respectively a subscriber unit baud clock and a subscriber unit baud clock phase, and wherein said base station comprises:

a base station controller;

a base station frequency generator coupled to said base station controller and configured to generate a base station baud clock exhibiting a base station baud clock phase;

a base station receiver coupled to said base station controller and configured to receive said reverse channel signal from said subscriber unit and produce said phase-error signal in response to a phase difference between said subscriber unit baud clock and said base station baud clock; and a base station transmitter coupled to said base station controller and configured to transmit said phase-error signal to said subscriber unit.

10. A digital communications system as claimed in claim 9 wherein said base station receiver comprises:

a base station down-converter coupled to said base station controller and configured to receive and down-convert said reverse channel signal from said subscriber unit;

a base station demodulator coupled to said base station controller and said base station down-converter, said base station demodulator being configured to produce said phase-error signal.

11. A digital communications system as claimed in claim 9 wherein said subscriber unit additionally comprises:
- a subscriber unit controller coupled to said subscriber unit transmitter;
- a subscriber unit frequency generator coupled to said subscriber unit controller and configured to generate said baud clock; and
- a subscriber unit receiver coupled to said subscriber unit controller and configured to receive said phase-error signal.

12. A digital communications system as claimed in claim 11 wherein said interpolator is configured to adjust said subscriber unit baud clock phase in response to said phase-error signal, and said subscriber unit transmitter additionally comprises:
- a modulator coupled to said subscriber unit controller and configured to produce said reverse channel signal;
- an up-converter coupled to said modulator through said interpolator.

13. A digital communications system as claimed in claim 12 wherein said subscriber unit interpolator comprises a plurality of coefficient multipliers arranged as an array configured to:
- accept said reverse channel signal from said subscriber unit modulator, wherein said reverse channel signal incorporates said subscriber unit baud clock as a component thereof; and
- adjust said subscriber unit baud clock phase within said reverse channel signal in response to said phase-error signal.

14. A digital communications system as claimed in claim 13 wherein said interpolator is a Farrow interpolator comprising a plurality of finite impulse response (FIR) filters wherein a coefficient of each of said FIR filters is a piecewise polynomial coefficient.

15. A digital communications system as claimed in claim 12 wherein said subscriber unit transmitter additionally comprises a pulse shaper coupled between said modulator and said interpolator, wherein said pulse shaper is a filter configured to provide a maximum throughput of said reverse channel signal at a given moment in time while providing substantially zero throughput moments separated from said maximum throughput moment by integral cycles of said baud clock.

16. A digital communications system as claimed in claim 15 wherein:
- said subscriber unit is one of a plurality of subscriber units communicating with said base station;
- each of said plurality of subscriber units is configured to generate a baud clock exhibiting a baud clock phase;
- each of said plurality of subscriber units comprises a subscriber unit transmitter, and said subscriber unit transmitter comprises an interpolator configured to be responsive to said baud clock and to adjust said baud clock phase;
- each of said subscriber unit transmitters is configured to transmit a reverse channel signal that incorporates said baud clock as a component thereof; and
- said interpolator in each of said subscriber units is configured to adjust said subscriber unit baud clock phase of said each subscriber unit so that when said pulse shaper of a given subscriber unit is providing said maximum throughput moment, said pulse shapers of other subscriber units are providing one of said substantially zero throughput moments.

17. A digital communications system as claimed in claim 8 wherein said base station and said subscriber unit are substantially stationary relative to each other.

* * * * *

UNITED STATES PATENT AND TRADEMARK OFFICE
CERTIFICATE OF CORRECTION

PATENT NO. : 6,452,948 B1
DATED : September 17, 2002
INVENTOR(S) : McCallister et al.

It is certified that error appears in the above-identified patent and that said Letters Patent is hereby corrected as shown below:

Column 4,
Line 56, replace "value α a" with -- value α --.

Column 5,
Line 47, replace "$(\beta_{C'}x\beta_{F'})$" with --$(\beta_{C}'x\beta_{F}')$--.

Column 6,
Line 39, replace "$\gamma=(\eta_{C}'x\beta_{F}')$" with --$\beta'=(\beta_{C}'x\beta_{F}')$--.

Line 40, replace "$\gamma'xF_{SU}$" with --$\gamma'xf_{SU'}$--.

Column 7,
Line 40, replace "operation-scenario" with -- operation scenario --.

Signed and Sealed this

Twenty-eighth Day of January, 2003

JAMES E. ROGAN
*Director of the United States Patent and Trademark Office*